US012751897B2

(12) United States Patent
Jeong

(10) Patent No.: US 12,751,897 B2
(45) Date of Patent: Oct. 6, 2026

(54) HEIGHT ADJUSTABLE MOVING MODULE AND ACUPRESSURE BED HAVING THE SAME

(71) Applicant: 3H CO., LTD., Daegu (KR)

(72) Inventor: Young Jae Jeong, Daegu (KR)

(73) Assignee: 3H CO., LTD., Daegu (KR)

( * ) Notice: Subject to any disclaimer, the term of this patent is extended or adjusted under 35 U.S.C. 154(b) by 0 days.

(21) Appl. No.: 18/862,169

(22) PCT Filed: Mar. 20, 2024

(86) PCT No.: PCT/KR2024/003506
§ 371 (c)(1),
(2) Date: Nov. 1, 2024

(87) PCT Pub. No.: WO2024/205117
PCT Pub. Date: Oct. 3, 2024

(65) Prior Publication Data

US 2026/0157931 A1 Jun. 11, 2026

(30) Foreign Application Priority Data

Mar. 28, 2023 (KR) ........................ 10-2023-0040468

(51) Int. Cl.
*A61H 39/04* (2006.01)
*A61H 39/02* (2006.01)

(52) U.S. Cl.
CPC ............. *A61H 39/04* (2013.01); *A61H 39/02* (2013.01); *A61H 2201/0142* (2013.01);
(Continued)

(58) Field of Classification Search
CPC ............ A61H 2201/0142; A61H 39/04; A61H 39/02; A61H 39/00; A61H 2205/081;
(Continued)

(56) References Cited

U.S. PATENT DOCUMENTS

2004/0158176 A1 8/2004 Park

FOREIGN PATENT DOCUMENTS

KR 200311358 Y1 * 4/2003 ............. A61H 39/04
KR 10-1906848 B1 12/2018
(Continued)

OTHER PUBLICATIONS

English translation for KR200311358Y1 (Year: 2003).*
(Continued)

*Primary Examiner* — Majid Jamialahmadi
(74) *Attorney, Agent, or Firm* — IP&T GROUP LLP

(57) ABSTRACT

Height adjustable moving module and acupressure bed having the same disclosed. According to one aspect of the present invention, there is provided an acupressure bed that performs acupressure treatment on a user by means of an acupressure unit arranged in a bed frame, wherein the acupressure unit includes an acupressure board, an acupressure member including a plurality of acupressure rods that are liftably fitted into the acupressure board, a moving module that moves forward and backward on a bottom surface and sequentially supports the plurality of acupressure rods to be protruded with an inclined surface of a hinge plate formed thereon, thereby applying acupressure to acupuncture point of a user and a control unit configured for moving the moving module forward and backward and adjusting its height, wherein the moving module is provided with a load cell configured for measuring an external force applied downward through the inclined surface, wherein the control unit is configured for obtaining a user body shape information regarding the user's body contour from a measurement of the load cell, and adjusting the height of the moving module by varying a folding angle of the hinge plate of the moving module.

8 Claims, 10 Drawing Sheets

(52) U.S. Cl.
CPC ................ *A61H 2201/0165* (2013.01); *A61H 2201/0196* (2013.01); *A61H 2201/123* (2013.01); *A61H 2201/1418* (2013.01); *A61H 2201/1481* (2013.01); *A61H 2205/081* (2013.01); *A61H 2230/805* (2013.01)

(58) Field of Classification Search
CPC .... A61H 2201/1669; A61H 2201/1481; A61H 1/008; A61H 7/004; A61H 15/0078
See application file for complete search history.

(56) References Cited

FOREIGN PATENT DOCUMENTS

| | | | | |
|---|---|---|---|---|
| KR | 10-2020-0005268 | A | 1/2020 | |
| KR | 10-2164236 | B1 | 10/2020 | |
| KR | 10-2220887 | B1 | 3/2021 | |
| KR | 10-2226593 | B1 | 3/2021 | |
| KR | 102220890 | B1 * | 3/2021 | ............. A61H 39/04 |
| KR | 10-2021-0056477 | A | 5/2021 | |
| KR | 10-2393939 | B1 | 5/2022 | |
| WO | 2022/114425 | A1 | 6/2022 | |

OTHER PUBLICATIONS

English translation for KR102220890B1 (Year: 2021).*
Extended European Search Report for European Patent Application No. 24781108.6 issued by the European Patent Office on Feb. 12, 2026.
International Search Report for International Patent Application No. PCT/KR2024/003506 issued by the International Searching Authority on Jun. 24, 2024.

* cited by examiner (a)

(b)

HEIGHT ADJUSTABLE MOVING MODULE AND ACUPRESSURE BED HAVING THE SAME

This application is a national stage application of PCT/KR2024/003506 filed on Mar. 20, 2024, which claims priority to Korean Patent Application No. 10-2023-0040468 filed on Mar. 28, 2023. The disclosure of each of the foregoing applications is incorporated herein by reference in its entirety.

FIELD OF THE INVENTION

The present invention relates to an acupressure bed, and more particularly to a height-adjustable moving module implemented as a height-adjustable type of moving module configured for lifting up and down acupressure rods, and to an acupressure bed having the same.

BACKGROUND

Generally, a physiotherapy device for acupressure on the spine is implemented in the form of a bed so that the patient can receive the treatment comfortably while lying down.

There are two main types of acupressure: direct acupressure and indirect acupressure. In the direct acupressure method, a moving body with a protruding acupressure part is set up to move from side to side and directly pressurize the acupuncture points on the spine. In the indirect acupressure method, a moving body is set up to move from side to side to push up and release a plurality of acupressure members to be appeared, and the acupressure members press the acupuncture points on the spine in turn.

In the case of the indirect acupressure method, the acupressure members are indirectly pushed up by the moving body and only the acupuncture points are pressed, which eliminates unnecessary acupressure compared to the direct acupressure method and may be configured to be less burdensome on the machine.

However, the protruding height of the acupressure member is fixed, so it has the limitation of not being able to adaptively respond to the user's body shape.

DETAILED DESCRIPTION OF THE INVENTION

Technical Objectives

The present invention is to provide a height-adjustable moving module and an acupressure bed having the same, which may provide various acupressure treatments desired by a user by varying the intensity of acupressure on acupuncture points by adjusting the protruding height of the acupressure member with an inclined plate for adjusting an angle of inclination.

The present invention is to provide a height-adjustable moving module and an acupressure bed having the same, which may provide acupressure suitable for a user's body contour by detecting a contour information according to the user's body contour with a moving module equipped with a load cell while moving and adjusting the protrusion height of the acupressure member by position according to the contour information.

Other objectives and advantages will be easily understood from the following description.

Technical Solution

According to one aspect of the present invention, there is provided an acupressure bed that performs acupressure treatment on a user by means of an acupressure unit arranged in a bed frame, wherein the acupressure unit includes an acupressure board, an acupressure member including a plurality of acupressure rods that are liftably fitted into the acupressure board, a moving module that moves forward and backward on a bottom surface and sequentially supports the plurality of acupressure rods to be protruded with an inclined surface of a hinge plate formed thereon, thereby applying acupressure to acupuncture point of a user and a control unit configured for moving the moving module forward and backward and adjusting its height, wherein the moving module is provided with a load cell configured for measuring an external force applied downward through the inclined surface, wherein the control unit is configured for obtaining a user body shape information regarding the user's body contour from a measurement of the load cell, and adjusting the height of the moving module by varying a folding angle of the hinge plate of the moving module.

The moving module may include a moving body, a hinge lifting unit that is arranged liftably on an upper surface of the moving body, the hinge plate having a hinge shaft arranged on the hinge lifting unit, a drive motor arranged on the side of the moving body, and a cam rotated by the drive motor to lift the hinge lifting unit up and down, wherein the moving module is a height-adjustable moving module.

The hinge lifting unit may include an upper body having a hinge hole corresponding to the hinge shaft formed therein, a lower body spaced apart from the upper body within a certain range and a load cell arranged between the upper body and the lower body, wherein an external force transmitted through the hinge plate is applied to the load cell through the upper body.

The hinge plate may include a first inclined plate and a second inclined plate, being mutually hinged about the hinge shaft and having a positive (+) inclination and a negative (−) inclination, respectively, wherein an one end of the first inclined plate is slidably connected to the front end of the moving body, and an one end of the second inclined plate is slidably connected to the rear end of the moving body, wherein the inclination angles of the first inclined plate and the second inclined plate are adjusted in accordance with a lifting of the hinge shaft by the hinge lifting unit.

The lower body may further include a cam guide groove engraved in a horizontal direction in the middle of the body on one side, wherein the cam includes an asymmetrical cam main body that rotates along a rotational shaft of the drive motor and a cam sub-body that is protruded parallel to the rotational axis at one end of the cam main body, wherein the cam sub-body is formed as a curved body having a predetermined curvature.

The cam may be assembled with the hinge lifting unit so that the cam sub-body is movably inserted into the cam guide groove.

The control unit may operate the drive motor to vary the height of the cam sub-body, thereby adjusting the folding angle of the hinge plate, wherein when the cam sub-body is located at the lowest point, the hinge plate is maximally unfolded and has the gentlest inclination, and when the cam sub-body is located at the highest point, the hinge plate is maximally folded and has the steepest inclination.

The control unit may be configured for generating the user body shape information for the user by collecting measurements at each location where the acupressure rods are located measured by the load cell while moving the moving module while the user is lying down, generating a correction value based on the difference between a standard body type information and the user body shape information, and finding a user acupuncture point by correcting a standard acupuncture point with the correction value, thereby providing an acupressure service.

The control unit may be configured for adjusting the height of the moving module at each location where the acupressure rods are located to find a height at which a preset measurement is measured by the load cell, generating the user body shape information by integrating the heights for each location, generating the correction value based on the difference between the standard body shape information and the user body shape information, and finding a user acupuncture point by correcting a standard acupuncture point with the correction value, thereby providing an acupressure service.

The plurality of acupressure rods arranged in the same row may be simultaneously lifted up and down as the roller arranged at the bottom is pushed up by the hinge plate, wherein the hinge lifting unit has a structure that slides left and right, wherein the control unit is configured for obtaining a first body shape information about the left body of the user from the measurements of the load cell by deflecting the hinge lifting unit to the left when moving the moving module for the first time so that the hinge plate supports the left part of the roller, and obtaining a second body shape information about the right body of the user from the measurements of the load cell by deflecting the hinge lifting unit to the right when moving the moving module for the second time so that the hinge plate supports the right part of the roller, and obtaining the user body shape information by integrating the first body shape information and the second body shape information.

Other aspects, features, and advantages will be more apparent from accompanying drawings, claims and detailed description.

Effects of the Invention

According to embodiments of the present invention, it is advantageous that various acupressure treatments desired by a user may be provided by varying the intensity of acupressure on acupuncture points by adjusting the protruding height of the acupressure member with an inclined plate for adjusting an angle of inclination.

In addition, it is advantageous that acupressure suitable for a user's body contour may be provided by detecting the contour information according to the user's body contour with a moving module equipped with a load cell while moving and adjusting the protrusion height of the acupressure member by position according to the contour information.

BRIEF DESCRIPTION OF ACCOMPANYING DRAWINGS

MODE FOR INVENTION

Figure 1:
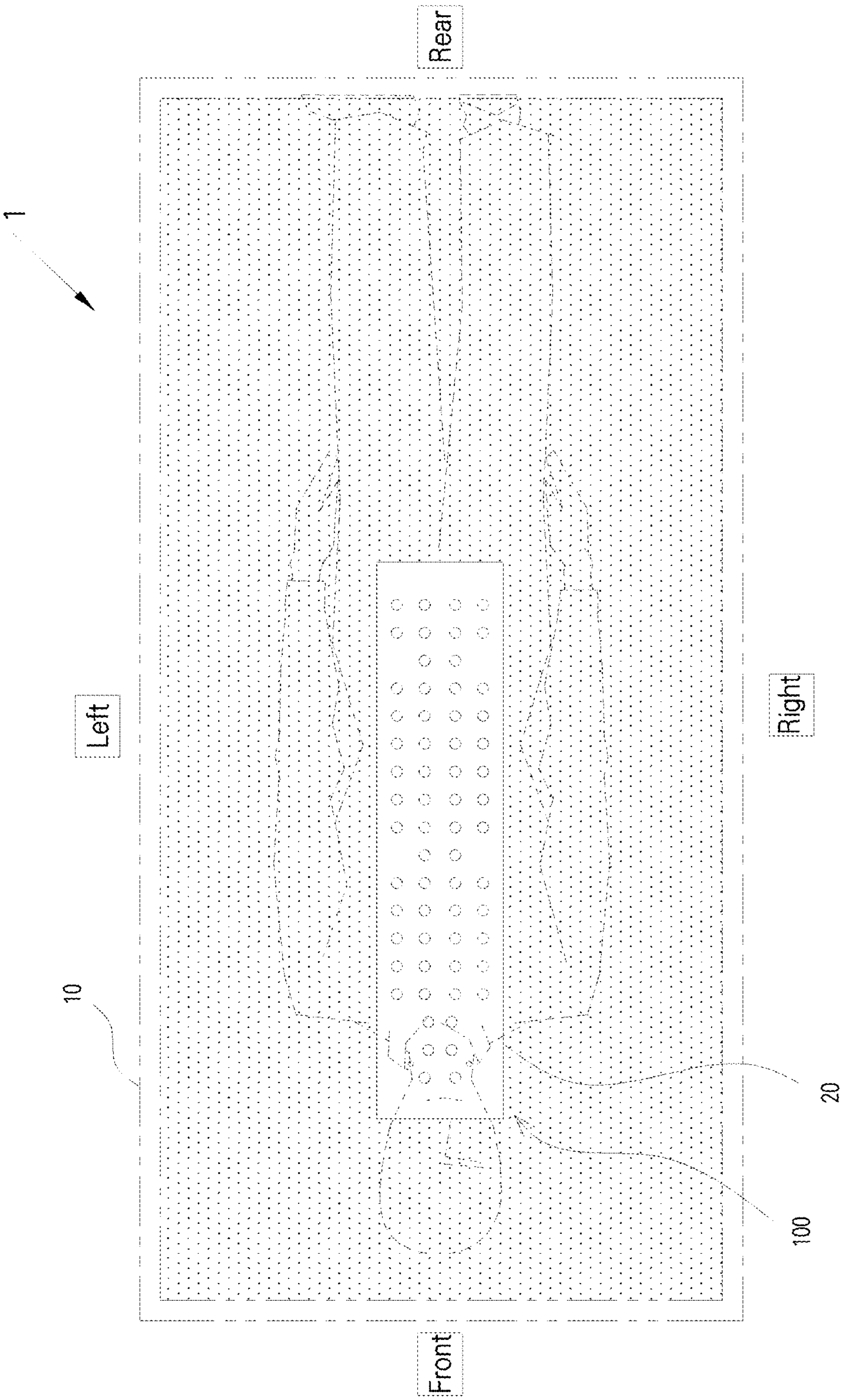
FIG. 1 is a top view of an acupressure bed including a height-adjustable moving module according to one embodiment of the present invention.

The invention can be modified in various forms and specific embodiments will be described and shown below. However, the embodiments are not intended to limit the invention, but it should be understood that the invention includes all the modifications, equivalents, and replacements belonging to the concept and the technical scope of the invention.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

Terms such as first, second, etc., may be used to refer to various elements, but, these element should not be limited due to these terms. These terms will be used to distinguish one element from another element.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Elements of an embodiment described below with reference to the accompanying drawings are not limited to the corresponding embodiment, may be included in another embodiment without departing from the technical spirit of the invention. Although particular description is not made, plural embodiments may be embodied as one embodiment.

In describing the invention with reference to the accompanying drawings, like elements are referenced by like reference numerals or signs regardless of the drawing numbers and description thereof is not repeated. If it is determined that detailed description of known techniques involved in the invention makes the gist of the invention obscure, the detailed description thereof will not be made.

Terms such as ~part, ~unit, ~module mean an element configured for performing a function or an operation. This may be implemented in hardware, software or combination thereof.

Figure 2:
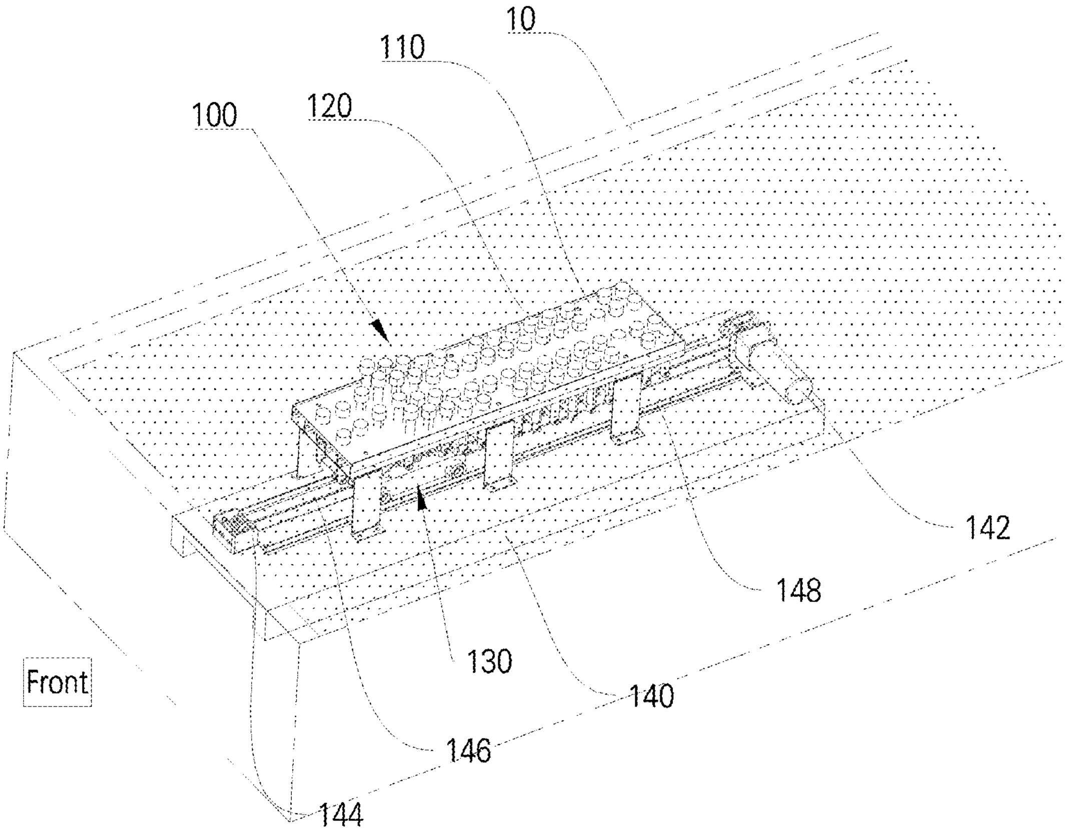
FIG. 2 is a perspective view of the acupressure bed.
Figure 3:
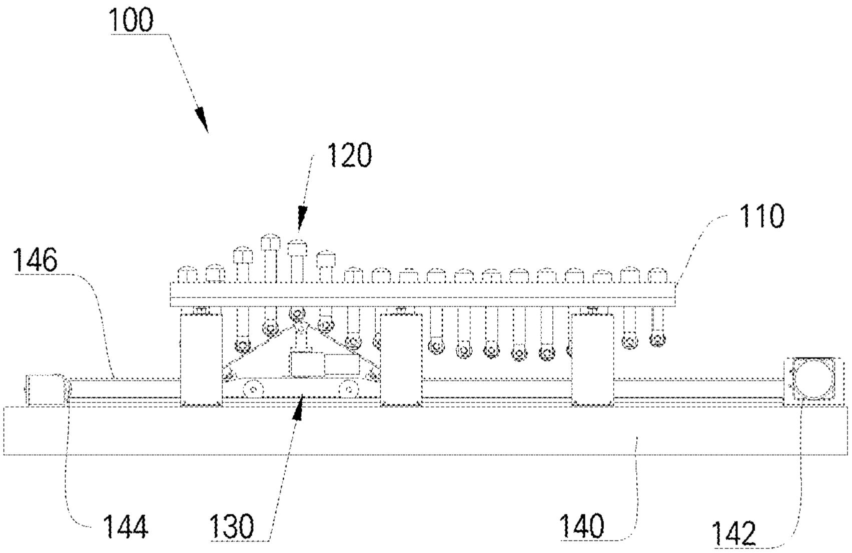
FIG. 3 illustrates how a acupressure unit of the acupressure bed in operation.
Figure 4:
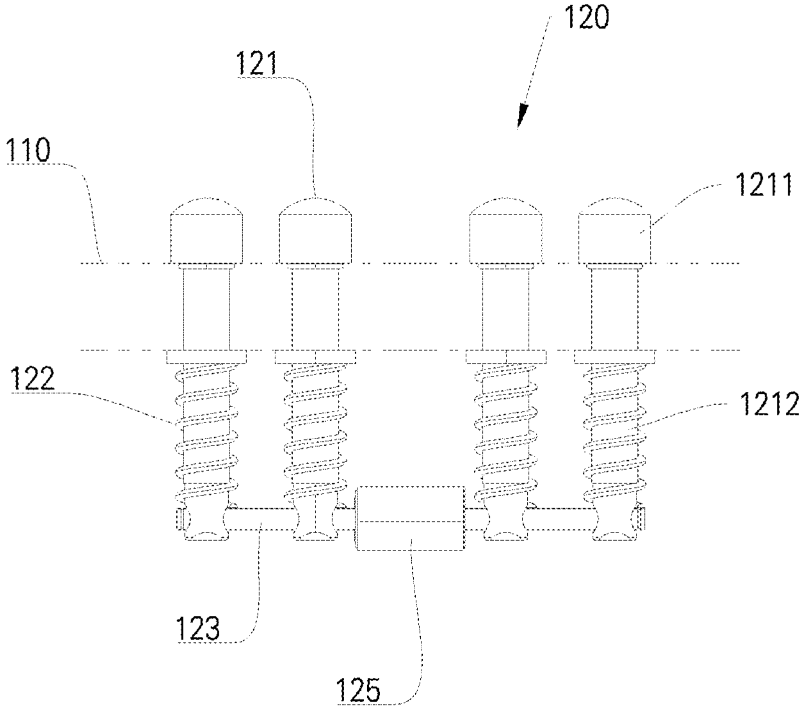
FIG. 4 illustrates a configuration of an acupressure member.
Figure 5:
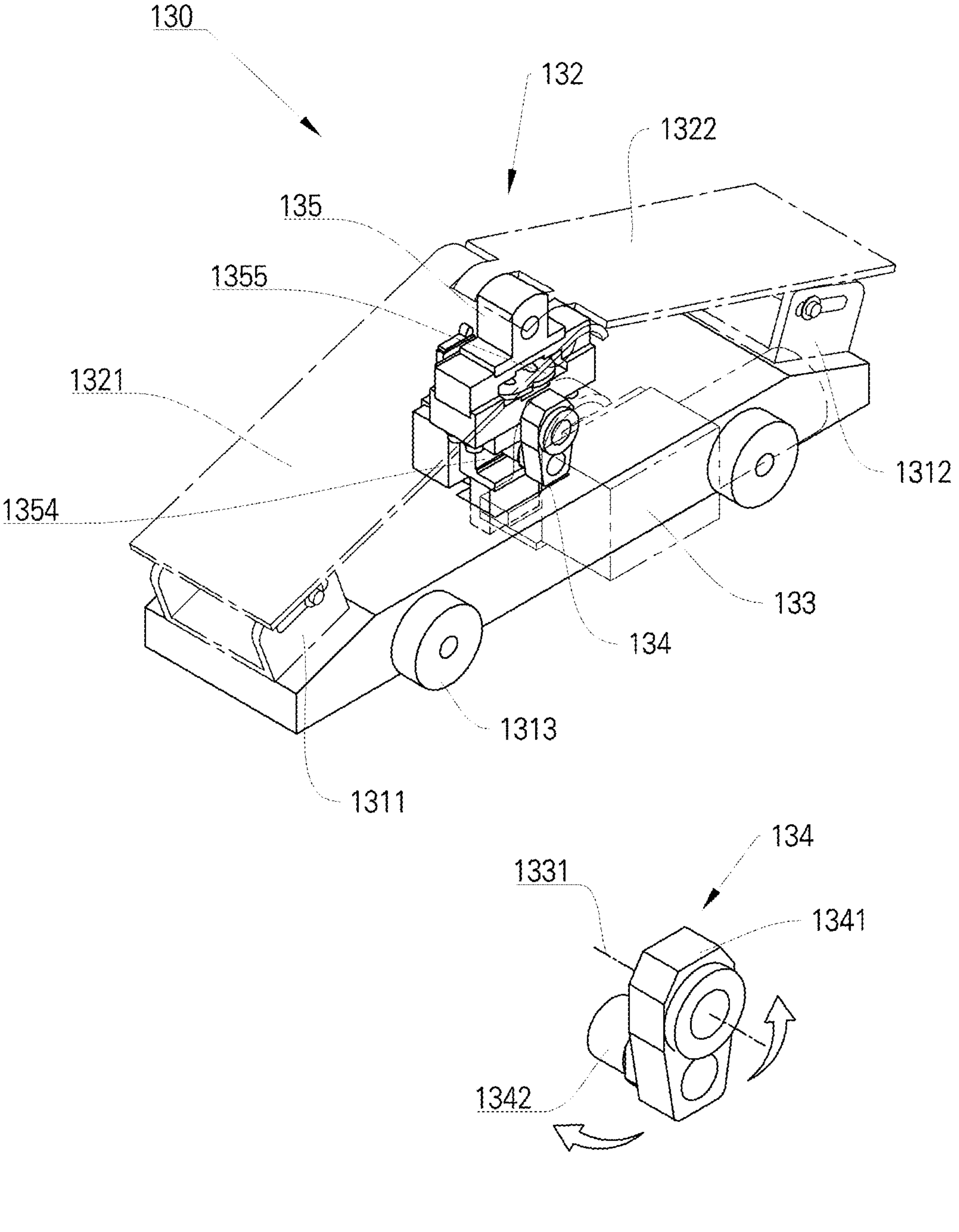
FIG. 5 and FIG. 6 are perspective views of one side of the height-adjustable moving module set to a minimum inclination and a maximum inclination.
Figure 6:
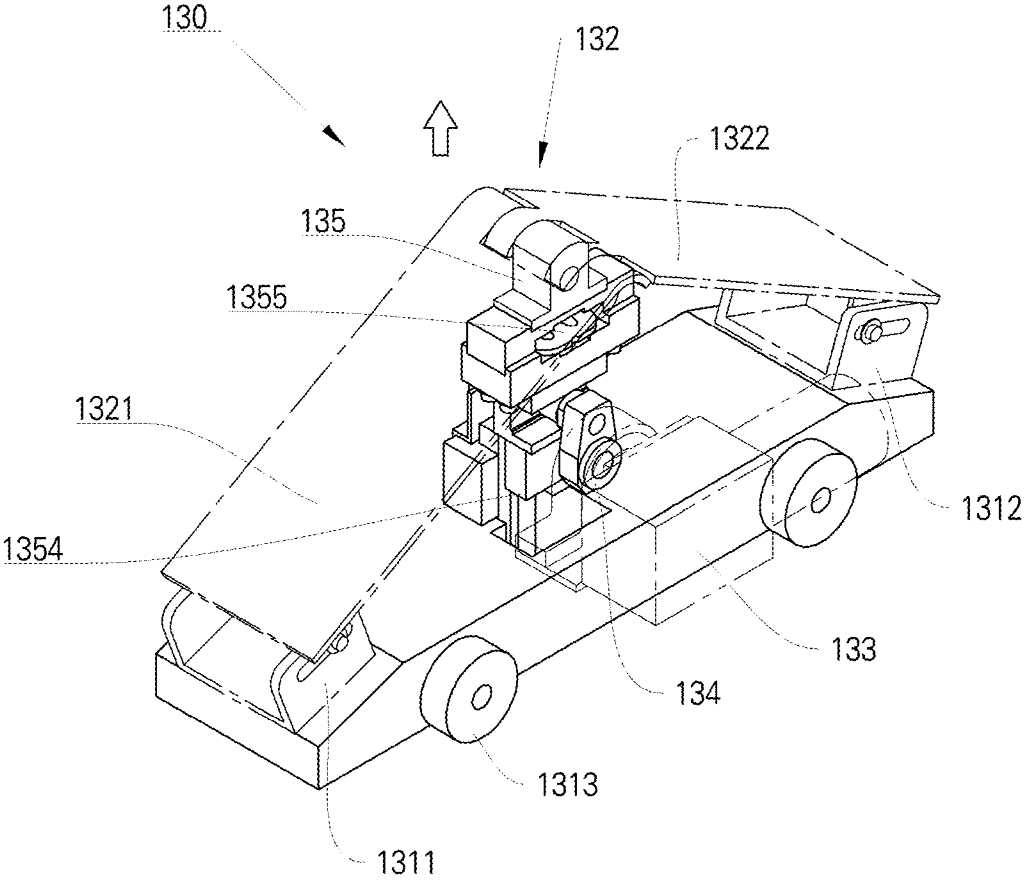
Figure 7:
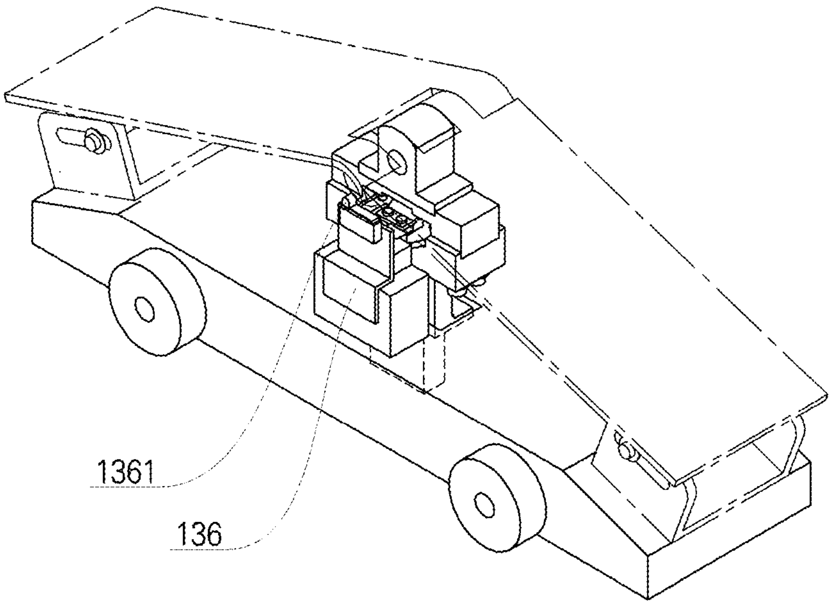
FIG. 7 and FIG. 8 are perspective views of the other side of the height-adjustable moving module.
Figure 8:
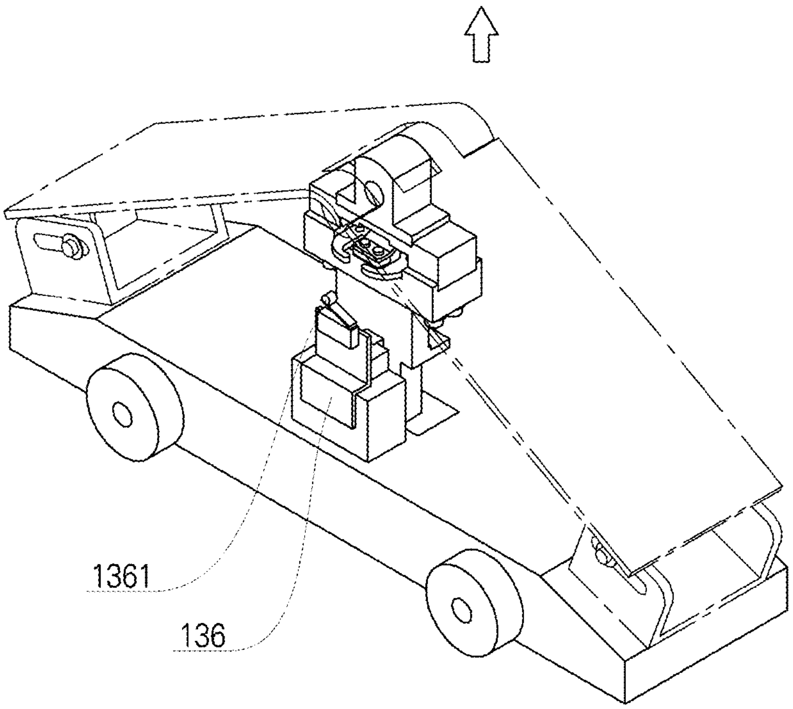
Figure 9:
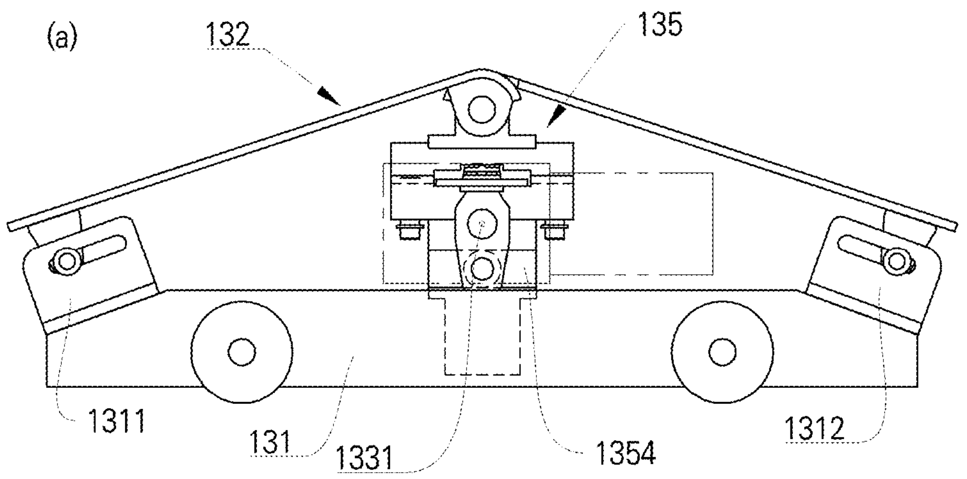
FIG. 9 is one side view of the height-adjustable moving module adjusted to a minimum and a maximum inclination.
Figure 9:
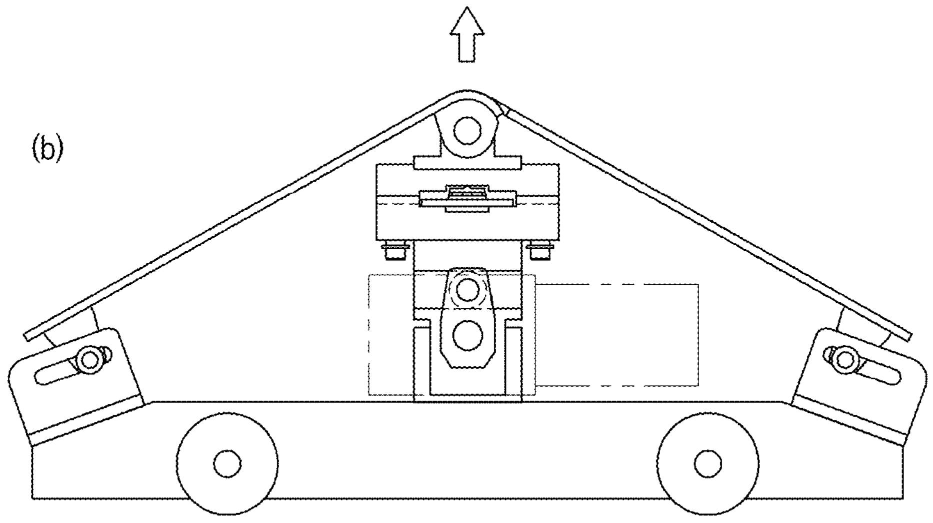
Figure 10:
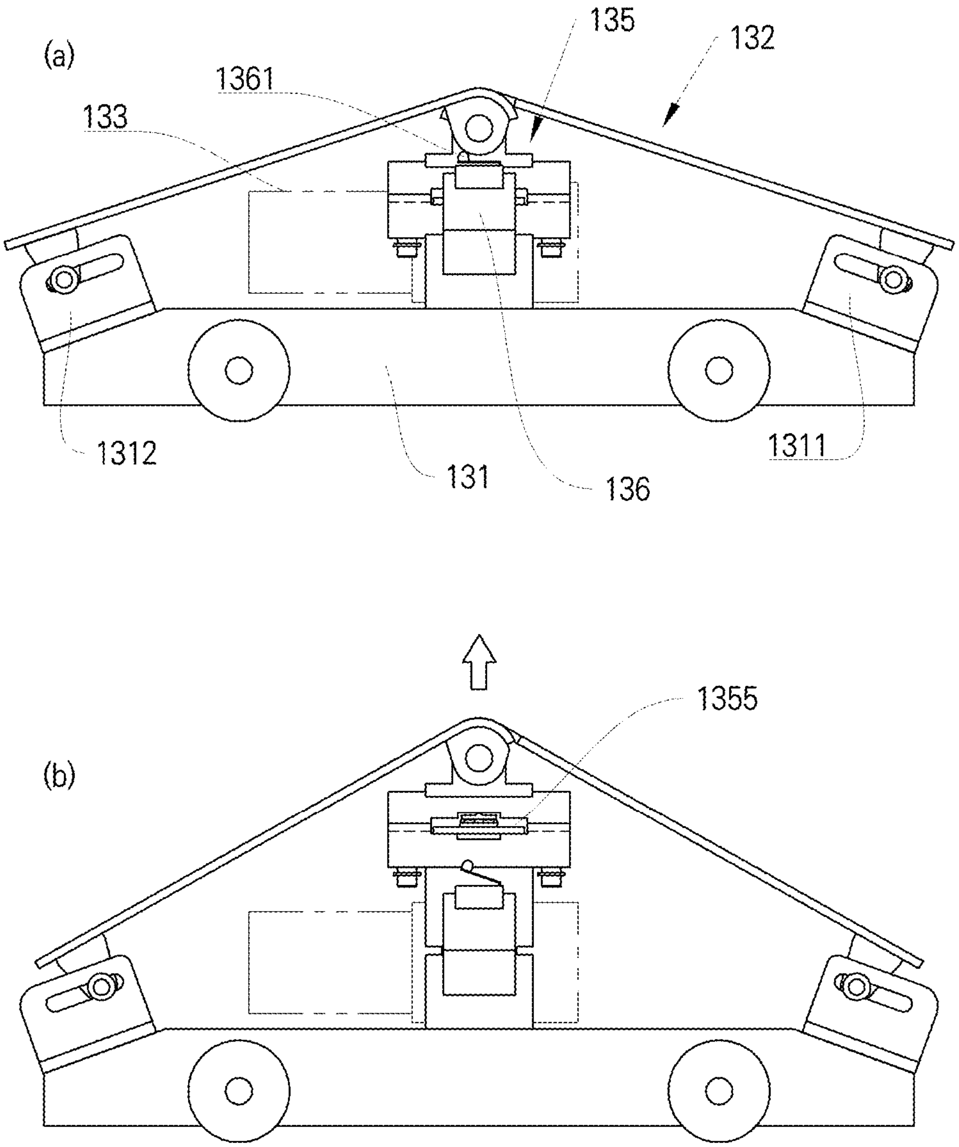
FIG. 10 is the other side view of the height-adjustable moving module adjusted to a minimum and a maximum inclination.
Figure 11:
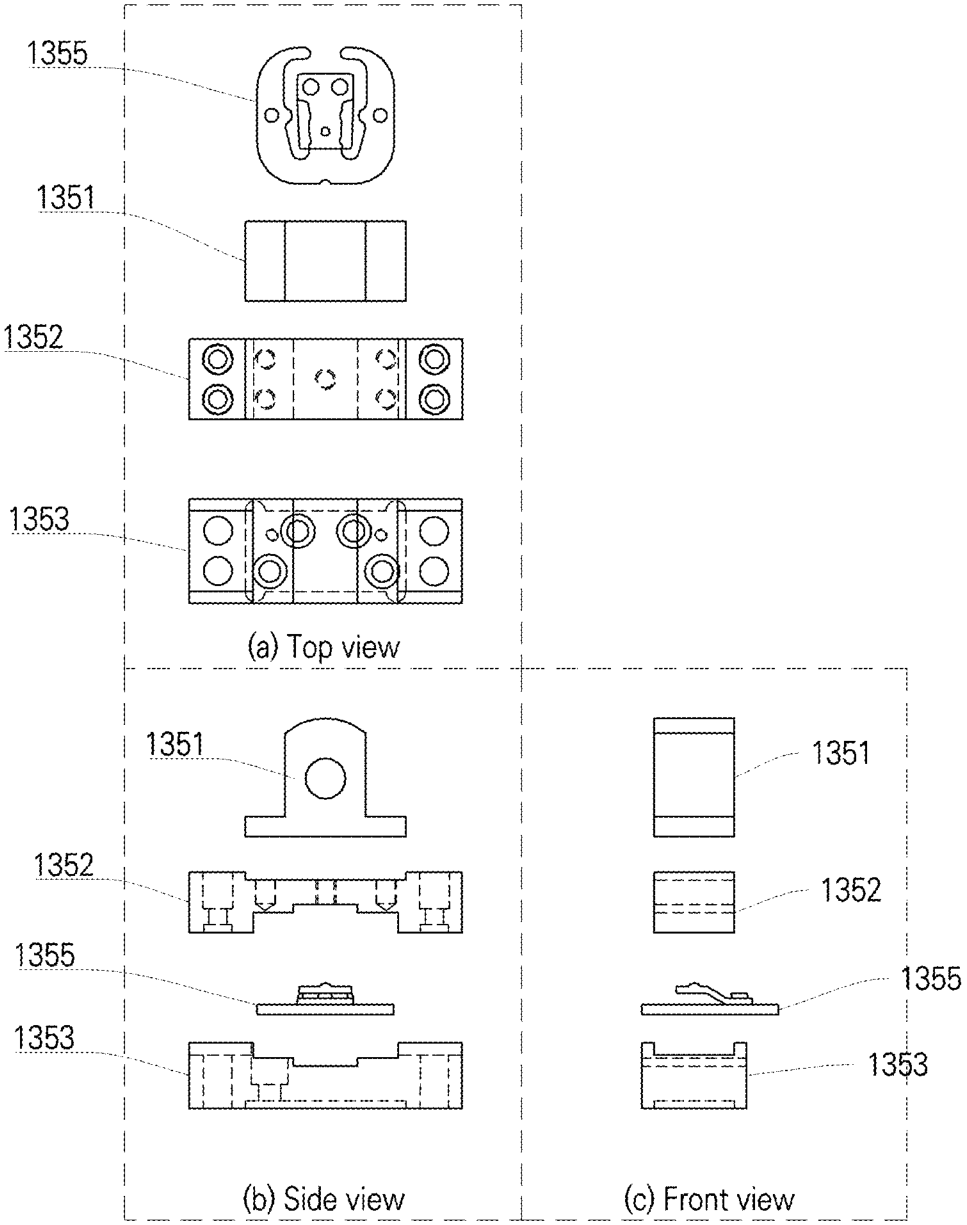
FIG. 11 is an exploded view of a hinge lifting unit.
Figure 12:
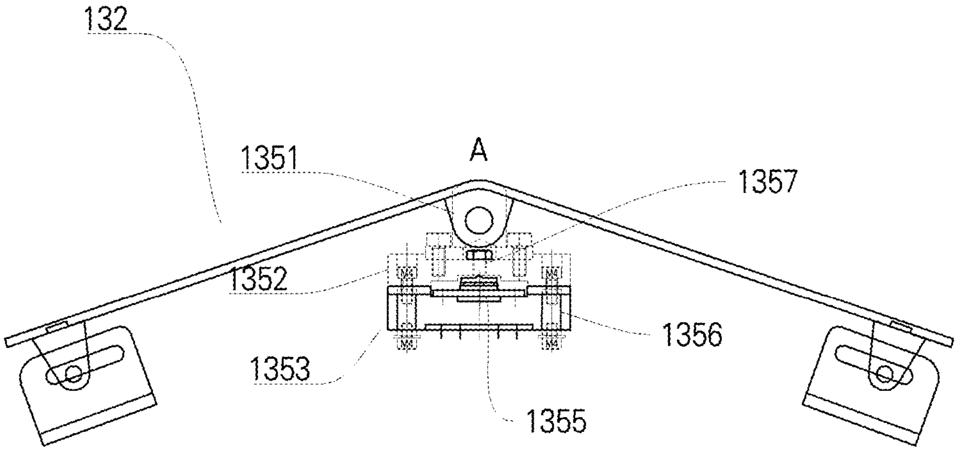
FIG. 12 illustrates a connection relationship of the hinge lifting unit.

FIG. 1 is a top view of an acupressure bed including a height-adjustable moving module according to one embodiment of the present invention, FIG. 2 is a perspective view of the acupressure bed, FIG. 3 illustrates how a acupressure unit of the acupressure bed in operation, FIG. 4 illustrates a configuration of an acupressure member, FIG. 5 and FIG. 6 are perspective views of one side of the height-adjustable moving module set to a minimum inclination and a maximum inclination, FIG. 7 and FIG. 8 are perspective views of the other side of the height-adjustable moving module, FIG. 9 is one side view of the height-adjustable moving module adjusted to a minimum and a maximum inclination, FIG. 10 is the other side view of the height-adjustable moving module adjusted to a minimum and a maximum inclination, FIG. 11 is an exploded view of a hinge lifting unit, and FIG. 12 illustrates a connection relationship of the hinge lifting unit.

FIGS. 1 to 12 show an acupressure bed 1, a bed frame 10, an opening 20, an acupressure unit 100, an acupressure board 110, an acupressure member 120, an acupressure rod 121, a first spring 122, a connecting shaft 123, a roller 125, a moving module 130, a bottom surface 140, a transfer motor 142, a belt pulley 144, a transfer belt 146, a moving guide 148, a moving body 131, a front guide 1311, a rear guide 1312, wheels 1313, a hinge plate 132, a first inclined plate 1321, a second inclined plate 1322, a guide protrusion 1323, a hinge shaft 1325, a drive motor 133, a cam 134, a cam main body 1341, a cam sub-body 1342, a hinge lifting unit 135, a hinge hole 1351, an upper body 1352, a lower body 1353, a cam guide groove 1354, a load cell 1355, a connecting pin 1356, a bolt 1357, a support member 136, and a stopper 1361.

In the acupressure bed 1 including the height-adjustable moving module according to one embodiment of the present invention, the indirect acupressure method of performing acupressure on acupuncture points by pushing up the acupressure member using the moving module is implemented.

The moving module is characterized in that it has the inclined plate with an adjustable inclination angle, which enables adjustment of the protruding height of the acupressure member, and enables varying the intensity of the acupressure on the acupuncture points to provide a variety of acupressure desired by the user.

In addition, the moving module is equipped with the load cell to measure the resistance applied to the inclined plate due to the user's weight, so that it is possible to sense the user's body contour by the location where the acupressure member is arranged, and provide customized acupressure services corresponding to a contour information.

The acupressure bed 1 according to the present embodiment has, as its basic frame, a bed frame 10 including a top plate that supports a user lying thereon like a conventional bed and a support member that supports the top plate.

For better understanding and explanation of the invention, the following description will be made assuming that a user lies on the acupressure bed 1 with the head in front and the feet in rear, and the left and right sides correspond to the left and right sides of the user's body.

The acupressure unit 100 is arranged on a longitudinal centerline connecting the front and rear of the bed frame 10. The acupressure unit 100 may be arranged corresponding to one side of the bed frame 10, that is, a location where the spinal acupuncture points (from the neck to the buttocks) are located when a user of average height is lying down. A plurality of acupressure rods 121 arranged within the acupressure unit 100 may move in the upward and the downward direction to acupressure the spinal acupuncture points.

In this embodiment, since the acupressure is applied while the user is lying on the top plate, the pressure applied to the body during the acupressure may be distributed to provide comfort.

The top plate of the bed frame 10 may be provided with the opening 20, and the acupressure board 110 having a left-right symmetrical structure with respect to the centerline of the acupressure unit 100 may be arranged in the opening 20.

The acupressure board 110 is a plate in which a plurality of vertical movement passages are formed along a number of rows. A predetermined number (for example, 1 or 2) of vertical movement passages are arranged on the left and right sides of each row. One acupressure rod 121 may be liftably arranged in one vertical movement passage.

A lubricating member may be provided on the lower side of the vertical movement passage into which the acupressure rod 121 is inserted to reduce wear and noise caused by friction between the acupressure rod 121 that moves up and down and the vertical movement passage. The lubricating member may be made of a wool material containing lubricant and fitted to the acupressure rod 121 in the form of a ring, and may be arranged on the acupressure board 110 together with the acupressure rod 121.

The acupressure rod 121 includes the acupressure head 1211 and the rod body 1212.

The 1211 acupressure head has a convex surface that allows direct and gentle acupressure to be applied to the user's body, especially to spinal acupuncture points. The surface of the acupressure head 1211 may have protrusions formed on it to enhance the acupressure effect.

The rod body 1212 may be coupled to the lower end of the acupressure head 1211. For example, the rod body 1212 may be formed with a passageway on the inner side, and the upper end may be fitted into an inner fitting groove of the acupressure head 1211 and fixed with an adhesive.

The lower portion of the rod body 1212 may be formed as a flat plane, so that the upward pressure by the inclined plates 1321, 1322 described later may be transmitted in a direction perpendicular to the rod body 1212. Additionally, the downward pressure on the acupressure rod 121 according to the user's weight may be transmitted to the inclined plates 1321, 1322.

The acupressure head 1211 has a large diameter compared to the rod body 1212. The inner diameter of the vertical movement passage may be smaller than the diameter of the acupressure head 1211 and larger than or equal to the diameter of the rod body 1212. Thus, the acupressure rod 121 has a structure such that the acupressure head 1211 hangs over the top surface of the acupressure board 110 when the acupressure rod 121 is fitted into the vertical movement passage. A bushing may be arranged in the vertical movement passage to allow the rod body 1212 to be lifted smoothly.

Referring to FIG. 4, the first spring 122 is interposed between the lower surface of the acupressure board 110 and the lower end of the rod body 1212 to allow the acupressure rod 121 to maintain a default position with a constant protrusion height when there is no external force. In this case, a locking protrusion may protrude from the lower periphery of the rod body 1212, so that the first spring 122 may be prevented from dislodging.

The second spring (not shown) may also be interposed between the upper surface of the acupressure board 110 and the acupressure head 1211. The second spring may function as a shock absorber that allows the acupressure head 1211 to maintain a certain height of separation from the top surface of the acupressure board 110, and absorbs the impact shock caused by the external force (e.g., the user's body weight) when it is forced downwardly by the external force.

When the roller 125 arranged at the center of the connecting shaft 123 is forced upward by the moving module 130, the acupressure rod 121 fitted into the connecting shaft 123 also rises upward.

When the moving module 130 moves forward and backward, the roller 125 is pushed up and down along the inclined plane formed by the inclined plates 1321, 1322 arranged on the moving module 130, thereby allowing the acupressure rod 121 to be lifted up and down.

In some embodiments, the connecting shaft 123 and the roller 125 may be omitted, and the acupressure rods 121 may be lifted up and down individually. In this case, each of the acupressure rods 121 may be directly supported by the moving module 130, particularly the inclined plate, and may be lifted up by receiving an upward force.

When the upward force disappears as the moving module 130 moves, the acupressure rod 121 is lifted downward by gravity and the first spring, and returns to the default position in which the acupressure head 1211 is placed on the top surface of the acupressure board 110.

Referring to FIG. 5, the moving module 130 is a height-adjustable moving module that is moved forward and backward by an operating unit and whose inclination is adjusted.

The operating unit may include the transfer motor 142 that moves the moving module 130 forward and backward, and the drive motor 133 that adjusts the inclination. The operation of the operating unit will be described in detail later.

The moving module 130 may include the moving body 131, the hinge plate 132, the drive motor 133, and the hinge lifting unit 135.

The moving body 131 is a body part having a predetermined width and length, and is provided with four wheels 1313 so that it may move forward and backward by itself or by an external force.

In the case of moving by the external force, one end of the transfer belt 146 may be secured to the upper front end of the moving body 131. In addition, the other end of the transfer belt 146 may also be secured to the upper rear end of the moving body 131.

The transfer belt 146 forms a continuous closed curve together with the moving module 130. The transfer belt 146 is connected between the transfer motor 142 arranged at the front end of the bottom surface of the acupressure unit 100 and the belt pulley 144 arranged at the rear end, and may operate like a conveyor belt by the transfer motor 142. Therefore, when the transfer belt 146 operates according to the driving of the transfer motor 142, the moving module 130 may move forward or backward.

The moving guide 148 is provided on the bottom surface 140 of the acupressure unit 100, so that the moving body 131 may move along the moving guide 148 without deviating from the path.

The hinge plate 132 has a structure in which two inclined plates 1321, 1322 that are divided to have positive (+) and negative (−) inclinations are connected around the hinge shaft 1325. The two inclined plates 1321, 1322 may be mutually hinged about the hinge shaft 1325.

The first inclined plate 1321 is slidably movably connected at its end to the front end of the moving body 131. The front guide 1311 having a first elongated hole extending in the length direction of the body is arranged at the front end of the moving body 131. The first guide protrusion 1323 is arranged at the end of the first inclined plate 1321 so that the first guide protrusion 1323 may be arranged to move within the first elongated hole of the front guide 1311. Therefore, the end of the first inclined plate 1321 is limited in its range of movement within the front guide 1311, particularly within the first elongated hole.

The second inclined plate 1322 is slidably movably connected at its end to the rear end of the moving body 131. The rear guide 1312 having a second elongated hole extending in the length direction of the body is arranged at the rear end of the moving body 131. The second guide protrusion is arranged at the end of the second inclined plate 1322 so that the second guide protrusion may be arranged to move within the second elongated hole of the rear guide 1312. Therefore, the end of the second inclined plate 1322 is limited in its range of movement within the rear guide 1312, particularly within the second elongated hole.

Therefore, when the hinge shaft 1325 is lifted up or down, the first inclined plate 1321 and the second inclined plate 1322 are restricted in movement of their ends, so that the folding angle of the hinge plate 132 is varied to adjust the inclination angle.

The hinge lifting unit 135 is arranged under the hinge shaft 1325, so that the hinge shaft 1325 may be lifted up and down. The hinge lifting unit 135 is arranged on the moving body 131 so that it may move up and down. The hinge plate 132 may be supported by being spaced apart from the moving body 131 by the hinge lifting unit 135.

The hinge lifting unit 135 has the upper body 1352 that is arranged at the upper portion and has the hinge hole 1351 formed therein, and the lower body 1353 that has the cam guide groove 1354 formed at one side of the lower portion. The hinge shaft 1325 of the hinge plate 132 may be secured through the hinge hole 1351.

The upper body 1352 may be arranged on the lower body 1353 so as to be spaced within a certain range, and the upper body 1352 is arranged so as to be movable up and down by an external force. And the load cell 1355 is arranged between the upper body 1352 and the lower body 1353, and may measure the magnitude of the external force (particularly, the weight of the user body part according to the position of the user body part) applied to the upper body 1352 through the hinge plate 132.

The upper body 1352 and the lower body 1353 are formed with through holes corresponding to each other, and connecting pins 1356 connecting the upper body 1352 and the lower body 1353 through the through hole may be arranged.

Referring to FIGS. 11 and 12, the connecting pins 1356 may be installed in a symmetrical structure with four connecting pins 1356 front to back and left to right. By means of the connecting pins 1356 of this symmetrical structure, the upper body 1352 is prevented from being separated from the lower body 1353 while in a balanced state, and is guided to move up and down in the vertical direction, so that the external force in the vertical direction may always be applied to the load cell 1355 arranged between the upper body 1352 and the lower body 1353. Therefore, the load cell 1355 may measure the weight of the user body part more sensitively according to the position of user body part, thereby increasing the measurement accuracy.

The highest point A of the hinge plate 132 becomes the point where the pressure is most sensitively applied to the moving module 130, and the load cell 1355 may be positioned directly below it. In addition, by arranging the bolt 1357 on the measuring point of the load cell 1355, the sensitivity of the load cell 1355 may be increased by maintaining the gap between the upper body 1352 and the lower body 1353 within the certain range.

The moving body 131 may further include the drive motor 133 arranged on its side. The cam 134 may be arranged on a rotational shaft 1331 of the drive motor 133. The cam 134 may include the asymmetric cam main body 1341 that rotates along the rotational shaft 1331 and the cam sub-body 1342 that protrudes parallel to the rotational shaft 1331 at one end of the cam main body 1341. The cam sub-body 1342 has a large rotational movement along the rotational shaft 1331.

The cam 134 may be assembled to the hinge lifting unit 135 so that the cam sub-body 1342 is inserted into the cam guide groove 1354. The cam sub-body 1342 may be formed as a curved body having a predetermined curvature, for example, a cylinder.

The cam guide groove 1354 may be engraved on the lower body 1353 of the hinge lifting unit 135 so as to have a predetermined width and extend long in the horizontal direction. The width of the cam guide groove 1354 may be formed larger than the outer diameter of the cam sub-body 1342, so that the cam sub-body 1342 may move smoothly within the cam guide groove 1354.

The cam sub-body 1342 is inserted into the cam guide groove 1354, and when the cam 134 is rotated by the drive motor 133, the cam sub-body 1342 moves in a large circle around the rotational shaft 1331. The cam sub-body 1342 moves in the cam guide groove 1354, and depending on the position of the cam sub-body 1342, the hinge lifting unit 135 formed in the cam guide groove 1354 is lifted up or down.

FIG. 5 and (a) of FIG. 9 illustrate a case where the cam sub-body 1342 is at the lowest point. In this case, the hinge lifting unit 135 is also at the lowest position, so that the hinge plate 132 is at the widest spread shape, that is, the first inclined plate 1321 and the second inclined plate 1322 have the gentlest inclination angle.

FIG. 6 and (b) of FIG. 9 illustrate a case where the cam sub-body 1342 is at the highest point. In this case, the hinge lifting unit 135 is also at the highest point, so that the hinge plate 132 is at its narrowest shape, that is, the first inclined plate 1321 and the second inclined plate 1322 have the steepest inclination angle.

That is, the cam sub-body 1342 is located between the highest point and the lowest point in the height direction, and the height of the hinge lifting unit 135 is varied according to the position of the cam sub-body 1342, and the degree of unfolding of the hinge plate 132 is adjusted accordingly, so that the inclination angles of the first inclined plate 1321 and the second inclined plate 1322 may be adjusted.

Referring to FIG. 7, FIG. 8, and FIG. 10, the other side view of the moving module 130 is shown.

The support member 136 of a predetermined height may be arranged on the other side of the body of the hinge lifting unit 135, and the stopper 1361 may be arranged on the upper end thereof. When the cam sub-body 1342 is at the lowest point and the hinge plate 132 is at the widest spread shape, the hinge shaft 1325 is configured to contact the stopper 1361. The stopper 1361 may prevent the hinge shaft 1325 from further descending beyond a lower limit. In addition, the stopper 1361 may have an elastic body, and when it contacts the hinge shaft 1325, it may be pressed downward to generate a contact signal and transmit the contact signal to a control unit not shown via a wire.

By generating the contact signal, the control unit may estimate the current state of the hinge plate 132. And by gradually stopping the operation of the drive motor 133 by a control signal, it is possible to prevent the hinge plate 132 from being damaged due to the impact caused by the sudden change in position to the lowest point.

The acupressure bed according to the present embodiment may further include the control unit(not shown) configured for performing a acupressure bed control method that scans the user's body by moving the moving module 130 and adjusts the inclination of the moving module 130 for each location according to the result to perform acupressure customized for the user.

The control unit may be located inside the bed or separately located outside. If it is separately located outside, it may be implemented as a computing device such as a PC, and may communicate with a communication module located in the bed to receive various data for control and to transmit the control signal.

The control unit may control the operation of the drive motor 133 by the control signal, thereby adjusting the degree of unfolding of the hinge plate 132, namely, the inclination angle of the inclined plates.

The drive motor 133 may be provided with a rotation detection sensor that detects the degree of rotation. For example, the rotation detection sensor may be an encoder.

Data (for example, in the form of a table) matching the correlation between the sensor signal and the inclination angle of the inclined plates may be stored in a memory(not shown).

The control unit may receive the sensing data of the rotation detection sensor, analyze the sensing data to determine the degree of rotation of the drive motor 133, and estimate the inclination angle of the hinge plate 132. Then, depending on whether the target inclination angle is reached, the control signal may be output to control additional driving or stopping of the drive motor 133, so that the drive motor 133 is operated or stopped.

The inclination angle of the moving module 130 may be set to have a median value based on the standard body shape (body contour) of the user. Then, by controlling the operation of the drive motor 133 so that the inclination angle of the inclined plate increases or decreases depending on the user receiving the acupressure treatment, the optimal and effective acupressure treatment may be performed for each user.

Or, before performing the acupressure treatment, when the user is lying down, the moving module 130 may be moved to obtain information about the user's body shape (body contour).

The moving module 130 is provided with the load cell 1355, so that the magnitude of the external force applied to the hinge plate 132 may be measured. When the moving module 130 moves, the acupressure rod 121 is pushed up by the hinge plate 132. When the acupressure rod 121 comes into contact with the user's body, it receives downward resistance from the user's body, and this resistance is transmitted to the moving module 130, so that the load cell 1355 may measure its magnitude.

The magnitude of this resistance varies depending on the user's body contour, and by measuring the resistance that varies in the direction of the body length when the user lying down, information about the user's body contour (body shape information) may be obtained.

When the user's body shape information is acquired, the user's acupuncture points requiring acupressure may be corrected by comparing and analyzing the standard body shape information pre-stored in the memory. By applying a correction value in accordance with the user's body shape information to the standard acupuncture points predefined in accordance with the standard body shape information, a user-customized user acupuncture points may be set, and acupressure may be performed on these user acupuncture points in a specified order. Accordingly, the user may receive a customized acupressure service in which acupressure of an appropriate magnitude is performed on an appropriate acupressure point that reflects the user's body characteristics, rather than simply receiving a standard acupressure service that is just set.

The moving module 130 according to the present embodiment may operate the drive motor 133 to lift up and down the hinge lifting unit 135. That is, the height may be adjusted.

Therefore, the pressure applied to the hinge plate 132, that is, the magnitude of the resistance due to the user's body, may be measured while varying the height of the moving module 130 at the current stopped position. That is, even if the same resistance is measured in the moving module 130, the height of the highest point of the hinge plate 132 may be different depending on the position of the moving module 130. Therefore, a correction value may be applied to a measurement data collected depending on the height of the highest point.

Or, the height of the moving module 130 may be adjusted so that a preset pressure value is measured at an arbitrary position. That is, as each acupressure rod 121 moves sequentially to the arranged positions, the height may be varied until the same pressure value is obtained at each position, and the height at which the same pressure value is obtained may be converted into body contour data at that position.

For example, depending on the body contour, the height of the moving module 130 at which a specific pressure value is measured becomes low for one region close to the top of the bed (for example, hips, shoulders, etc.), and the height of the moving module 130 at which a specific pressure value is measured becomes high for the other region far from the top of the bed (for example, waist). Accordingly, the height at each position of the moving module 130 is data corresponding to the user's body contour, and the user's body shape information may be obtained by using the same.

In another embodiment, the width of the inclined plate of the moving module 130 may be manufactured to be smaller than that of the roller 125. In addition, the hinge plate 132 may be manufactured to be movable within a predetermined range in the left-right direction. The movable structure of the hinge plate 132 may be implemented by using a sliding module or a linear bar that enables left-right movement between the moving body 131 and the hinge lifting unit 135.

During the first scan, the hinge plate 132 moves in a left-biased state so that the first body shape information about the left side of the user's body can be obtained. And during the second scan, the hinge plate 132 moves in a right-biased state so that the second body shape information about the right side of the user's body can be obtained.

In most cases, the left and right sides are unbalanced depending on the user's posture. Therefore, by obtaining independent body shape information for the left and right sides, it is possible to obtain more accurate body shape information about the user and provide optimal acupressure services accordingly.

The above-described method of controlling acupressure bed may also be implemented in the form of a non-transitory recording medium including instructions executable by a computer, such as an application or program module executed by a computer. Non-transitory computer-readable medium can be any available media that can be accessed by a computer and includes both volatile and nonvolatile medium, removable and non-removable media. In addition, non-transitory computer-readable medium may include computer storage medium. Computer storage medium includes both volatile and nonvolatile, removable and non-removable media implemented in any method or technology for storage of information such as computer readable instructions, data structures, program modules or other data.

The above-described method of controlling acupressure bed may be executed by an application (which may include a program included in a platform or operating system by default disposed in the terminal) installed by default in the terminal, and by an application (i.e., program) that a user manually installed in the terminal after downloading from an application store server, or an application providing server such as a web server related to the application or service. In this sense, the above-described method of controlling acupressure bed may be implemented as an application (i.e., program) installed by default in the terminal or manually by a user, and may be recorded in the non-transitory computer-readable recording medium such as the terminal.

While the invention has been described above with reference to exemplary embodiments, it will be understood by those skilled in the art that the invention can be modified and changed in various forms without departing from the concept and scope of the invention described in the appended claims.

What is claimed is:

1. An acupressure bed that performs acupressure treatment on a user by means of an acupressure unit arranged in a bed frame,
   wherein the acupressure unit comprises:
   an acupressure board;
   an acupressure member including a plurality of acupressure rods that are liftably fitted into the acupressure board;
   a moving module that moves forward and backward on a bottom surface and sequentially supports the plurality of acupressure rods to be protruded with an inclined surface of a hinge plate formed thereon, thereby applying acupressure to acupuncture point of a user; and
   a control unit configured for moving the moving module forward and backward and adjusting its height,
   wherein the moving module is provided with a load cell configured for measuring an external force applied downward through the inclined surface,
   wherein the control unit is configured for obtaining a user body shape information regarding the user's body contour from a measurement of the load cell, and adjusting the height of the moving module by varying a folding angle of the hinge plate of the moving module,
wherein the moving module comprises:
   a moving body;
   a hinge lifting unit that is arranged liftably on an upper surface of the moving body;
   the hinge plate having a hinge shaft arranged on the hinge lifting unit;
   a drive motor arranged on a side of the moving body; and
   a cam rotated by the drive motor to lift the hinge lifting unit up and down,
   wherein the moving module is a height-adjustable moving module, and wherein the hinge lifting unit comprises:
   an upper body having a hinge hole corresponding to the hinge shaft formed therein;
   a lower body spaced apart from the upper body within a certain range; and
   the load cell arranged between the upper body and the lower body,
   wherein an external force transmitted through the hinge plate is applied to the load cell through the upper body.

2. The acupressure bed of claim 1, wherein the hinge plate comprises a first inclined plate and a second inclined plate, being mutually hinged about the hinge shaft and having a positive (+) inclination and a negative (−) inclination, respectively, wherein an one end of the first inclined plate is slidably connected to a front end of the moving body, and an one end of the second inclined plate is slidably connected to a rear end of the moving body, wherein the inclination angles of the first inclined plate and the second inclined plate are adjusted in accordance with a lifting of the hinge shaft by the hinge lifting unit.

3. The acupressure bed of claim 2, wherein the lower body further comprises a cam guide groove engraved in a horizontal direction in the middle of the body on one side, wherein the cam comprises an asymmetrical cam main body that rotates along a rotational shaft of the drive motor; and a cam sub-body that is protruded parallel to a rotational axis at one end of the cam main body, wherein the cam sub-body is formed as a curved body having a predetermined curvature.

4. The acupressure bed of claim 3, wherein the cam is assembled with the hinge lifting unit so that the cam sub-body is movably inserted into the cam guide groove.

5. The acupressure bed of claim 3, wherein the control unit operates the drive motor to vary the height of the cam sub-body, thereby adjusting the folding angle of the hinge plate, wherein when the cam sub-body is located at the lowest point, the hinge plate is maximally unfolded and has the gentlest inclination, and when the cam sub-body is located at the highest point, the hinge plate is maximally folded and has the steepest inclination.

6. The acupressure bed of claim 1, wherein the control unit is configured for generating the user body shape information for the user by collecting measurements at each location where the acupressure rods are located measured by the load cell while moving the moving module while the user is lying down, generating a correction value based on the difference between a standard body type information and the user body shape information, and finding a user acupuncture point by correcting a standard acupuncture point with the correction value, thereby providing an acupressure service.

7. The acupressure bed of claim 6, wherein the control unit is configured for adjusting the height of the moving module at each location where the acupressure rods are located to find a height at which a preset measurement is measured by the load cell, generating the user body shape information by integrating the heights for each location, generating the correction value based on the difference between the standard body shape information and the user body shape information, and finding a user acupuncture point by correcting a standard acupuncture point with the correction value, thereby providing an acupressure service.

8. The acupressure bed of claim 1, wherein the plurality of acupressure rods arranged in the same row are simultaneously lifted up and down as a roller arranged at the bottom is pushed up by the hinge plate, wherein the hinge lifting unit has a structure that slides left and right, wherein the control unit is configured for obtaining a first body shape information about the left body of the user from the measurements of the load cell by deflecting the hinge lifting unit to the left when moving the moving module for the first time so that the hinge plate supports the left part of the roller, and obtaining a second body shape information about the right body of the user from the measurements of the load cell by deflecting the hinge lifting unit to the right when moving the moving module for the second time so that the hinge plate supports the right part of the roller, and obtaining the user body shape information by integrating the first body shape information and the second body shape information.

* * * * *